Dec. 7, 1926.
E. H. THOMPSON ET AL
1,609,587
UNIVERSAL FARE BOX
Filed March 24, 1923
8 Sheets-Sheet 1
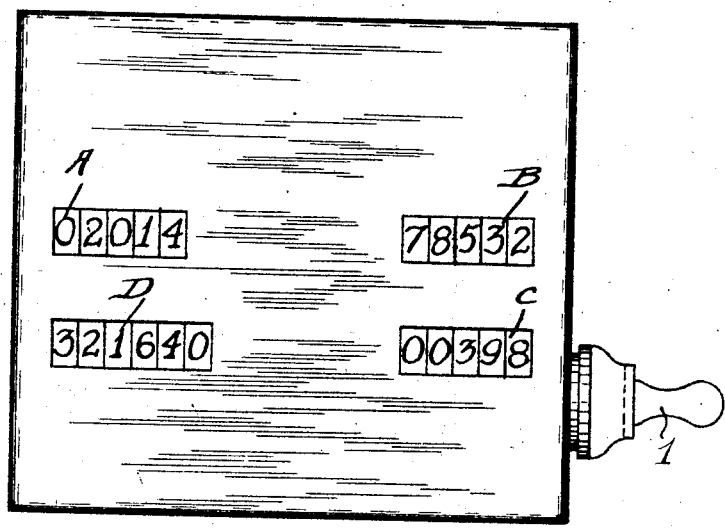
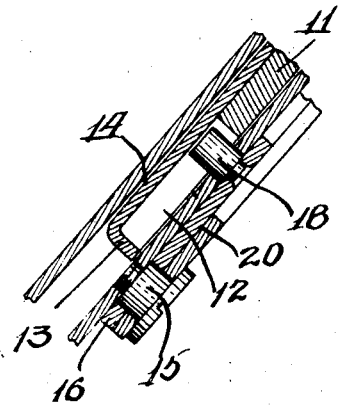
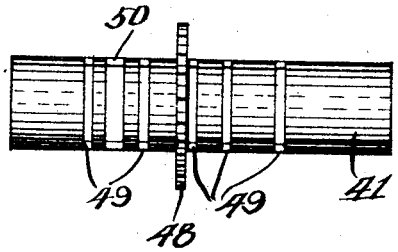

Dec. 7, 1926.
E. H. THOMPSON ET AL
1,609,587
UNIVERSAL FARE BOX
Filed March 24, 1923
8 Sheets-Sheet 2
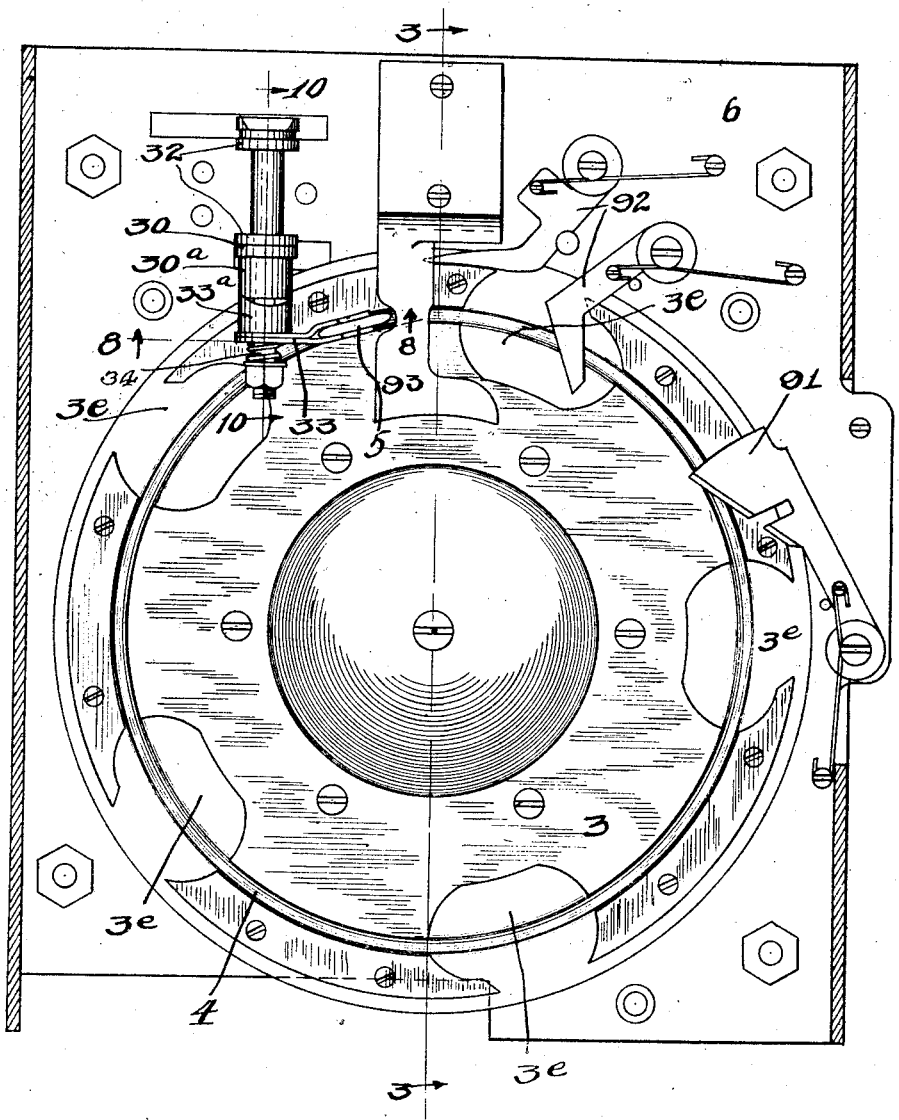

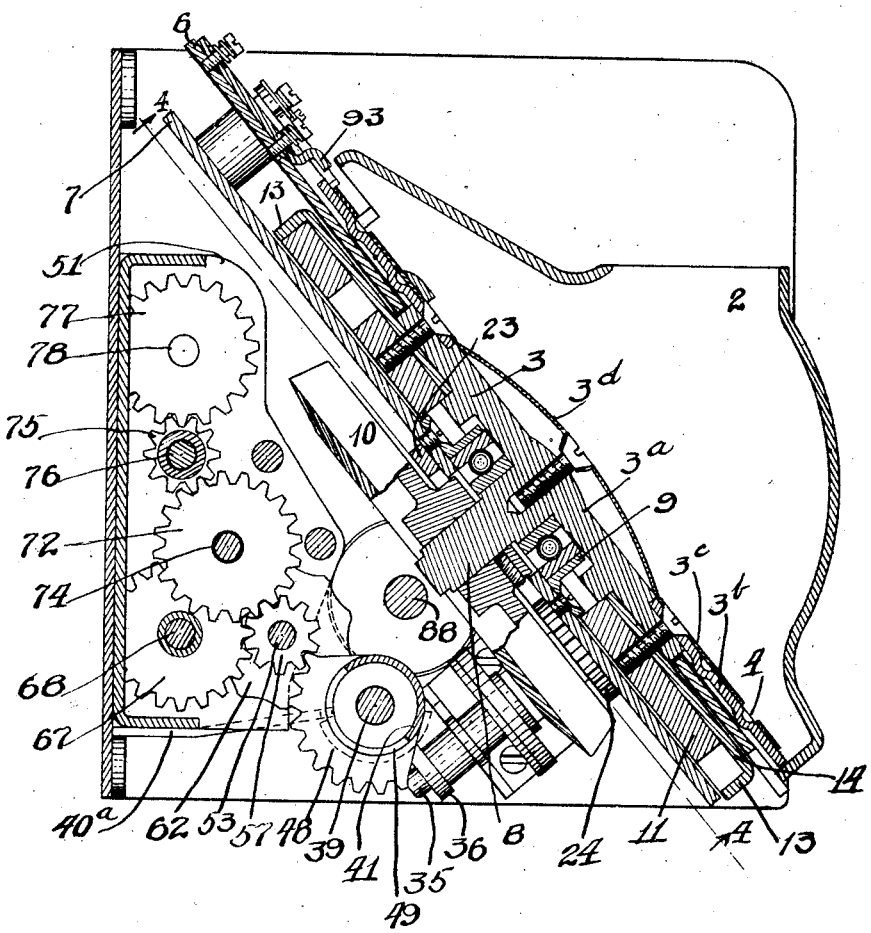

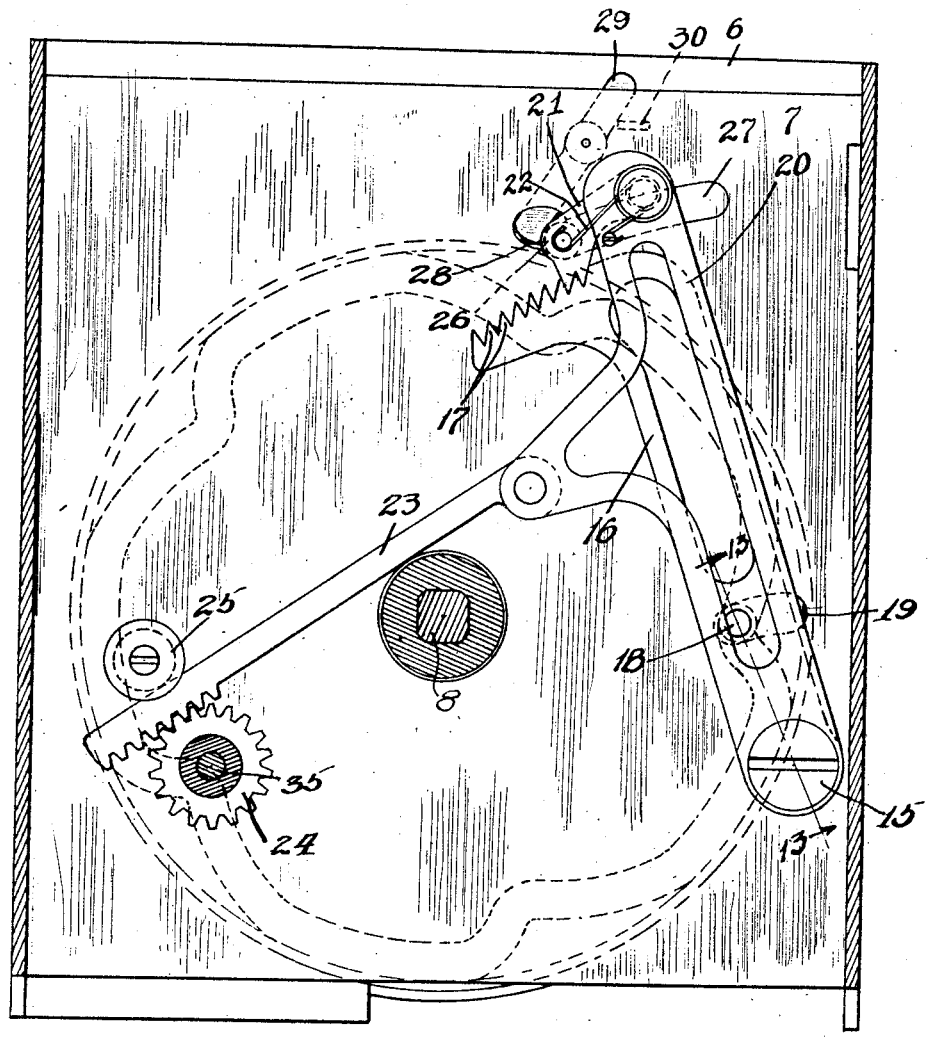

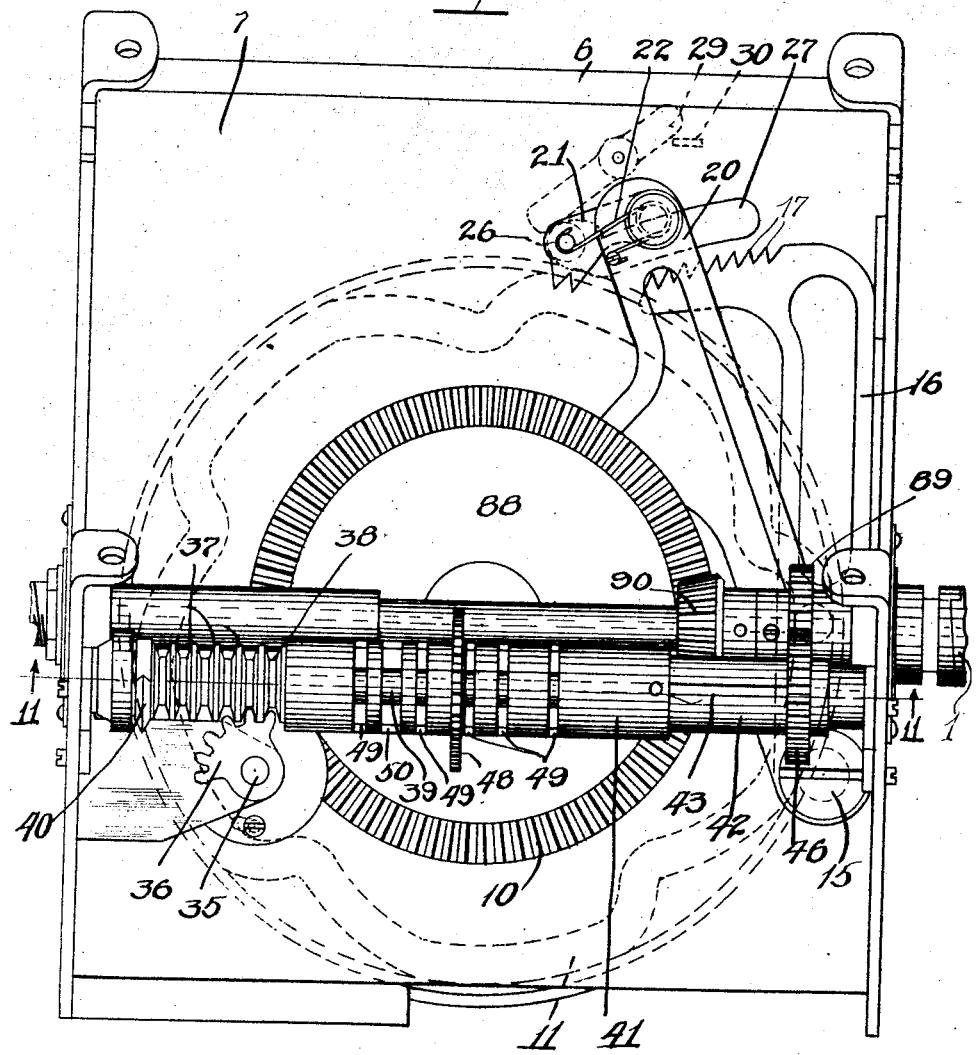

Dec. 7, 1926.
E. H. THOMPSON ET AL
1,609,587
UNIVERSAL FARE BOX
Filed March 24, 1923
8 Sheets-Sheet 6
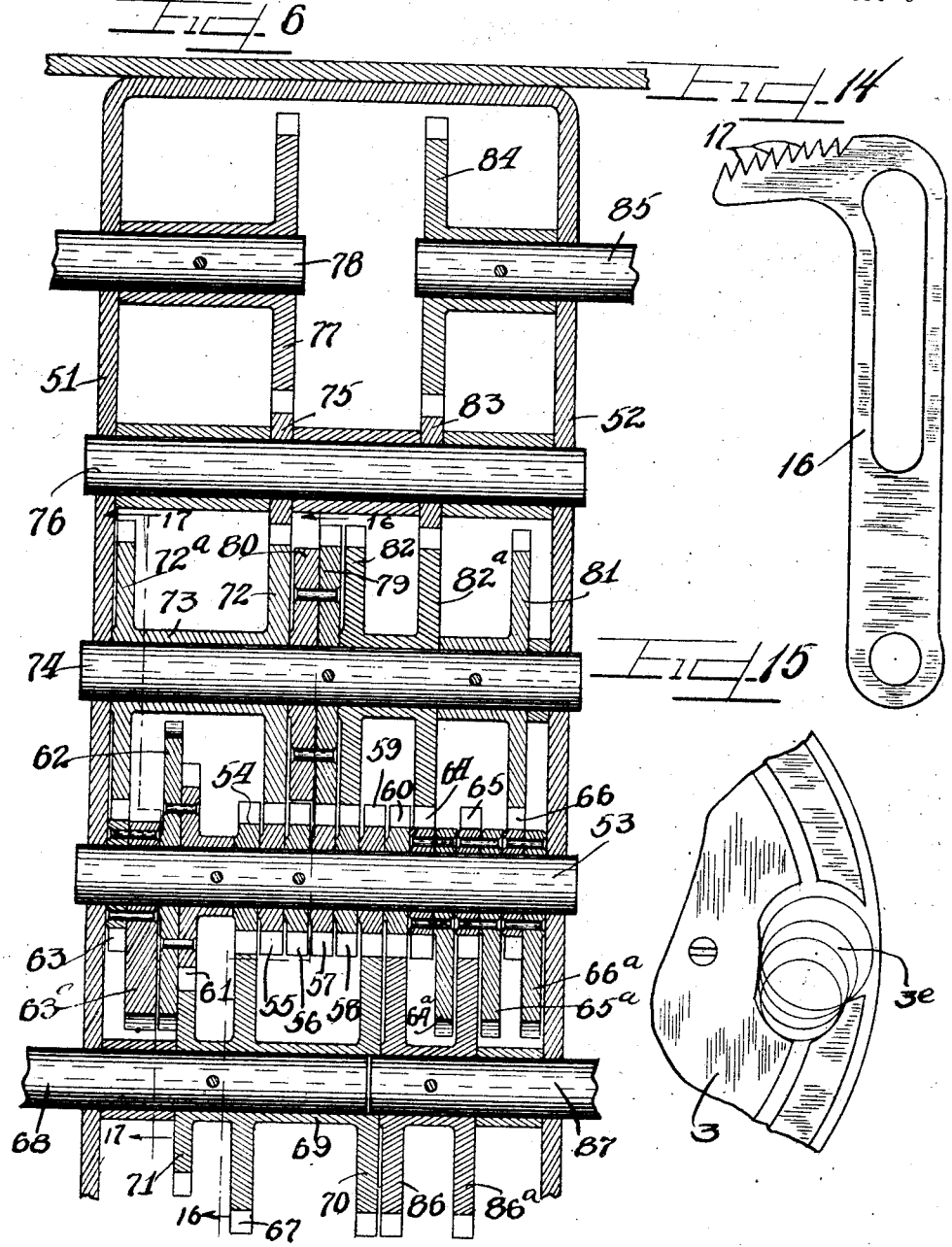

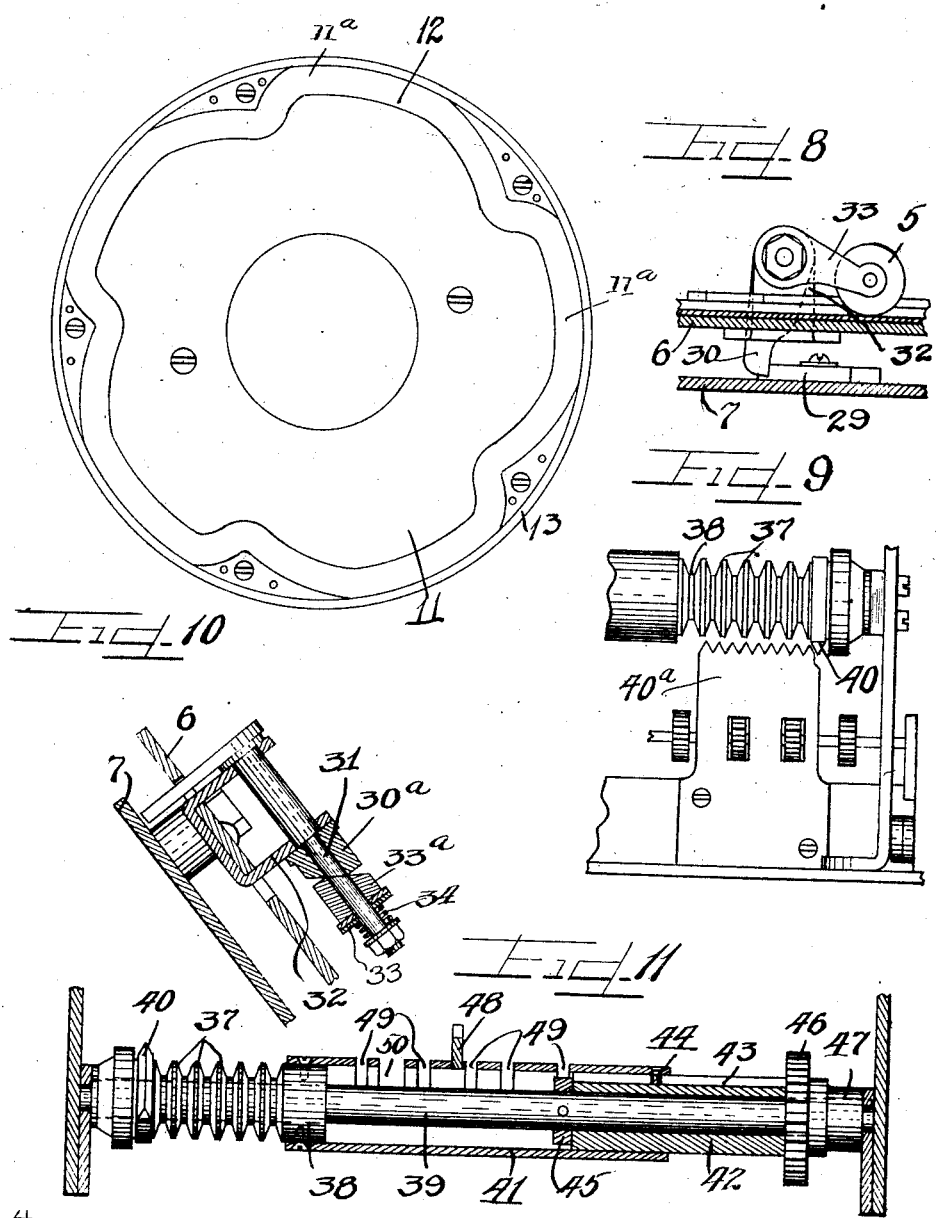

Dec. 7, 1926.
E. H. THOMPSON ET AL
1,609,587
UNIVERSAL FARE BOX
Filed March 24, 1923
8 Sheets-Sheet 8
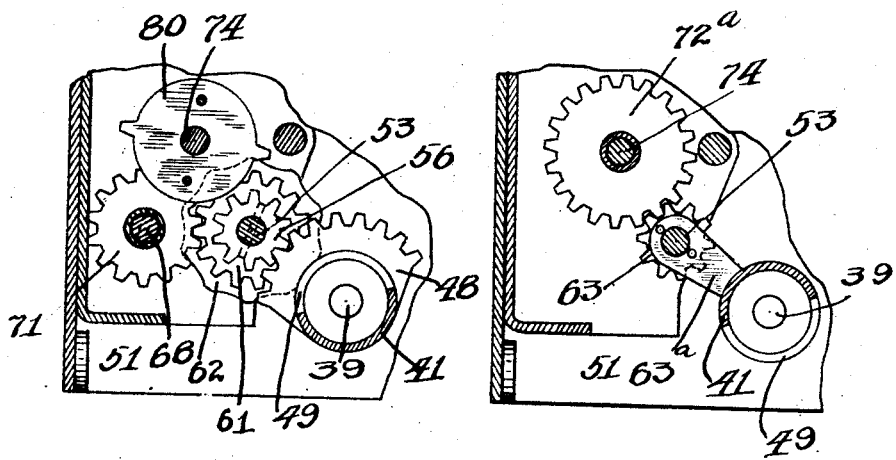
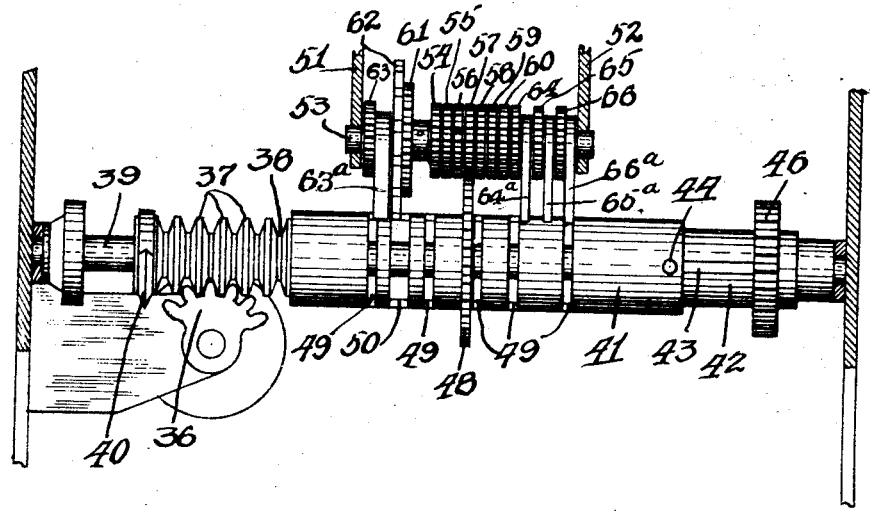

Patented Dec. 7, 1926.

1,609,587

UNITED STATES PATENT OFFICE.

ERNEST H. THOMPSON AND HUGO J. BAUR, OF CHICAGO, ILLINOIS, ASSIGNORS TO JOHNSON FARE BOX COMPANY, OF CHICAGO, ILLINOIS, A CORPORATION OF ILLINOIS.

UNIVERSAL FARE BOX.

Application filed March 24, 1923. Serial No. 627,275.

This invention relates to a universal fare box adapted to receive different coins and tokens or either and properly register the same.

It is an object of this invention to provide such a fare box in which the action of the parts is properly timed and locking mechanism provided in association with certain parts to control the operation of said parts to a predetermined extent, rendering thereby greater accuracy in operation.

It is also an object of this invention to provide such a fare box in which the action of the registering mechanism is governed by the diameter of the coins or tokens passing therethrough.

It is a further object of this invention to simplify the construction and operation of such a fare box that is capable of meeting the rigid demands of the service and that is always reliable and accurate in its action.

With these and other objects in view which will become more apparent in the following description and disclosures in the drawing, this invention comprises the novel mechanism and combinations hereinafter described and more particularly pointed out and defined in the appended claims.

In the accompanying drawings which illustrate a preferred embodiment of this invention and in which similar reference numerals refer to similar features in the different views:

Figure 1 is an elevational view of a fare box involving this invention.

Figure 2 is an enlarged section through the fare box showing the coin carrying or impelling disk and associated parts in plan view.

Figure 3 is an enlarged section through the fare box substantially upon the line 3—3 of Figure 2.

Figure 4 is an enlarged section through the fare box taken substantially upon the line 4—4 of Figure 3 showing parts in elevation and parts in dotted lines.

Figure 5 is an enlarged view through the fare box illustrating the operating mechanism in elevation.

Figure 6 is an enlarged section through the system of gearing connecting with the registering mechanism.

Figure 7 is an enlarged plan view of the cam disk.

Figure 8 is an enlarged section taken substantially upon the line 8—8 of Figure 2.

Figure 9 is an enlarged fragmentary elevational view of the shiftable selecting mechanism with its associated interlocking mechanism.

Figure 10 is an enlarged section substantially upon the line 10—10 of Figure 2.

Figure 11 is a section upon the line 11—11 of Figure 5.

Figure 12 is an elevational view of the shiftable selective sleeve.

Figure 13 is an enlarged fragmentary section upon the line 13—13 of Figure 4.

Figure 14 is an enlarged elevational view of the ratchet arm.

Figure 15 is a fragmentary plan view of a pocket in the coin carrying disk illustrating coins of different diameters in said pockets.

Figure 16 is a fragmentary section upon the line 16—16 of Figure 6.

Figure 17 is an enlarged section on the line 17—17 of Figure 6.

Figure 18 is an enlarged elevational view of the selective gear driving mechanism.

In referring to Figure 1, there is illustrated a fare box provided with four windows or sight holes through which the numerals of the different registering mechanisms may be seen. The window "A" shows the registration of a 650 token, the window "B" shows the number of 780 tokens and quarters registered, the window "C" shows the number of 900 tokens registered, while the window "D" shows the amount of cash registered. It will be understood that the numerals 650, 780 and 900 may be regarded as arbitrary symbols denoting tokens of different size and value, and they may be of any size or value, the numerals being merely used to differentiate one from the other.

A crank handle 1 secured upon a shaft which may project beyond the casing for this purpose is adapted to be manually rotated for operating the mechanism within the casing and registering the coins and tokens which are dropped into the casing through the usual receiving hopper 2 shown in Figure 3.

The coins and tokens that enter the hopper fall upon an inclined and rotatable coin carrying disk 3 provided with a concentric groove 4 in its upper face as shown in Figure 2 in which a roller 5 is adapted to track. As the disk is revolved, the coins will pass under the roller 5 and elevate the same for actuating certain mechanisms to be later explained. As the disk 3 revolves the coins will be stripped by the members 91, 92 and 93, the latter of which also guides them into engagement with the rollers.

The coin carrying disk 3 in the present instance comprises a plurality of elements as can best be seen by referring to Figure 3. It comprises a central hub plate $3^a$ having a short stud shaft 8 and upon which a marginal ring plate $3^b$ is inserted and secured to provide a flush upper surface with the hub plate, and a thin sheet metal plate $3^c$ provided with a central dome $3^d$ is secured over the upper surface of the hub plate $3^a$ and the concentric ring plate $3^b$; the dome serving to deflect the coins and tokens toward the margin of the disk. The upper surface of said disk is provided with a plurality of inwardly inclined coin or token holding pockets $3^e$. A stationary inclined plate 6 secured to the sides of the casing is provided with a central circular aperture to receive the central hub plate $3^a$ and forms a partial support for the coin carrying disk. A second inclined plate 7 in spaced parallel relation with the plate 6 and provided with a central aperture to receive the shaft 8 is positioned in a plane below the plate 6. This plate 7 supports a circular angle ring 9 within which a ball bearing is confined for journalling the shaft 8 which extends through the aperture in the plate 7 and is provided with a bevel gear 10 upon its outer end for imparting rotation to the coin carrying disk 3. These plates 6 and 7 may be suitably secured to the sides of the casing in any well known manner.

A cam 11 is secured to the bottom of the disk 3 for conjoint rotation therewith. A plan view of this cam is shown in Figure 7 and it will be noted that the cam consists of a disk having a groove 12 in its lower surface, which groove consists of five similar formations joined together whereby five similar oscillations may be effected by said cam. The outer periphery of the cam is formed by a flange 13 of a plate 14 superposed upon the back of the cam and secured thereto. The cam, however, may be formed in any desired way.

Upon the under side of the plate 7, there is a pivot stud 15 (Figures 4 and 13) which is positioned adjacent one side of the casing of the fare box and below the axis of the shaft 8. A slotted ratchet arm 16 having a plurality or a row of teeth 17 at its upper end is pivoted at its lower end upon the stud 15. Intermediate the ends of the ratchet arm, there is secured a stud 18 (Figures 4 and 13) which extends through an arcuate slot 19 in the plate 7 and into the cam groove 12 of the cam 11, whereby rotation of the coin carrying disk with the attached cam 11 will oscillate the ratchet arm backwards and forwards.

A lever 20 is also pivoted at its lower end upon the stud 15 and the upper end of this lever extends above the ratchet teeth 17 on the arm 16. A pawl 21 is pivoted upon the upper end of the lever 20 for periodically cooperating with the ratchet teeth 17. A spring 22 coiled about the pivot stud of the pawl has one end anchored to the lever 20 and the other end attached to the far end of the pawl. The action of this spring tends to normally hold the pawl out of engagement with the ratchet arm. A link 23 (Figure 4) is connected to an intermediate point of the lever; the outer end of the link being provided with gear teeth for engaging a gear 24; a roller 25 rotatably mounted upon the plate 7 adjacent the gear, contacts the back edge of the link and acts as a guide therefor to maintain the link or rack bar 23 in operative relation with the gear 24.

When the pawl 21 is in operative relation with the ratchet arm 16, the lever 20 will be constrained to oscillate with the ratchet arm and impart rotation to the gear 24. The pawl 21 is adapted to be put in operative relation with the teeth 17 upon each actuation of the aforementioned roller 5 and the exact point of engagement of the pawl 21 along the row of teeth 17 depends upon the time of actuation of the roller 5. Thus a coin of large diameter passing under the roller 5 will actuate the roller sooner than a smaller coin. Consequently, the larger coins will effect an engagement between the pawl 21 and ratchet teeth 17 sooner than a smaller coin, and as the ratchet arm is always in motion during the operation of the machine, the larger coins will effect a quicker engagement and hence a greater throw of the lever 20 and consequently impart a greater rotation to the gear 24.

The actuation and control of the pawl 21 is as follows:

A roller 26, shown in dotted lines in Figures 4 and 5, is mounted upon one side of the pawl 21. This roller travels in an arcuate slot 27 in the plate 7 and so maintains the pawl in engagement with the ratchet arm. The forward end of the slot 27 communicates with a circular aperture 28 in the plate 7 above the slot 27, into which the roller can pass and in which it normally rests. When the roller reaches the forward end of the slot 27, the spring 22 will become effective for elevating the pawl out of engagement with the ratchet bar, the roller passing into the circular aperture as shown in Figure 5. A lever 29 pivoted intermediate its ends between the plates 6 and 7 has one end in engagement with the roller 26 on the pawl. The other end of this lever is adapted to be operated by a lever 30 shown in dotted lines in Figures 4 and 5 and in elevational view in Figure 8. The lever 30 is provided with a bearing hub 30ª (Figure 10) journalled upon a shaft 31 which is supported by a U-shaped bracket 32 secured to the plate 6; the shaft projecting inwardly of the bracket so as to lie over the coin carrying disk. The forward face of the hub 30ª is provided with a cam surface which is in engagement with a cam surface on a hub 33ª integral with a lever arm 33 that supports the roller 5. A spring 34 confined between the hub 33ª and a nut on the end of the shaft 31 serves to maintain the hubs 30ª and 33ª in frictional and operative relation under normal operation. If, however, any obstructions are encountered in operating the fare box, the spring will yield, allowing a slippage between the hubs 30ª and 33ª, thereby avoiding damaging the mechanism of the fare box. It will be apparent that when the arm 33 is raised by a coin or token passing under the roller 5, the lever 30 will be simultaneously actuated to operate the lever 29 and throw the pawl 21 into engagement with the ratchet.

In referring to Figure 4 which illustrates the pawl 21 in engagement with the first tooth of the ratchet which is at the forward limit of its throw, the rearward oscillation of the ratchet arm will carry the lever 20 along and impart to it its greatest throw; the roller 26 of the pawl traveling in the arcuate slot 27. This means that the largest coin or token has just passed under the roller 5. Now when a coin of smaller diameter passes under the roller 5, the ratchet arm 16 will have traveled rearwardly to a certain extent from the position shown in Figure 4 before the lever 30 will actuate the lever 29 and bring the pawl 21 into engagement with the ratchet, so that some intermediate ratchet tooth will be engaged, thuswise reducing the throw of the lever 20 as the ratchet arm oscillates rearwardly.

The different throws thuswise imparted to the lever 20 will rotate the gear 24 different amounts. The operation of the gear 24 effects the engagement of selective gears for operating the registering mechanism. This gear 24 is secured upon one end of a shaft 35 suitably journalled in bearings secured to the fare box casing. On the other end of the shaft 35, there is a segmental gear 36 (Figures 5 and 18) which may be adjusted upon its support and which engages a plurality of tapered elements 37 formed upon a shiftable member 38 slidably mounted upon a shaft 39 suitably supported in bearings on the inner side of the fare box casing. These tapered elements are formed by cutting V-shaped grooves in the member 38 at regular intervals, the metal between the grooves constituting the tapered elements. At the outer end of the member 38 there is a segmental locking disk 40 adapted for rotary interlocking engagement with the grooves of an interlocking member 40ª (Figure 9) extending from the side of the casing.

The opposite end of the shiftable member 38 is provided with a cylindrical enlargement for fitting within a sleeve 41 which is secured thereto and slides therewith. The opposite end of said sleeve telescopes over a bushing 42 (Figure 11) rotatably mounted upon said shaft, said bushing being provided with a groove 43 and said sleeve being provided with a stud 44 slidable in said groove whereby said sleeve and bushing are connected for conjoint rotation and relative sliding movements. A washer 45 is secured to the shaft 39 at the end of the bushing 42 and prevents longitudinal movement of the latter. The outer end of the bushing 42 has a gear 46 attached thereto whereby rotation may be imparted to the bushing. A spacing member 47 may be used between the gear 46 and end bearing to maintain the gear in proper position.

A master segmental gear 48 is secured circumferentially of the sleeve 41 at substantially the medial point thereof, and circumferential slots 49 and 50 are formed at certain intervals along the sleeve for a purpose to be later set forth.

In the rear of the fare box, there is a gear casing comprising the side members 51 and 52 (Figures 3 and 6) in which trains of gears are supported that effect a driving connection between the gear segment 48 and the registering mechanisms. In referring to Figures 6 and 18, it will be observed that a shaft 53 is journalled in the side members 51 and 52 and supports a plurality of similar gears 54, 55, 56, 57, 58, 59 and 60 with which the gear segment 48 is adapted to be brought into mesh at various times. All of these gears, except gear 56, are rotatably mounted upon the shaft 53; gear 56 being keyed or secured thereon for rotating said shaft. A somewhat larger gear 61 is also keyed or secured upon the shaft 53 and a locking disk 62 is bolted to said gear for a purpose to be later described. Rotatably mounted on said shaft 53 are also a plurality of gears 63, 64, 65 and 66 which are similar to the gears 54 to 60 and which have locking arms 63ª, 64ª, 65ª and 66ª, respectively, bolted thereto. The locking disk 62 (see Figs. 3 and 16) is provided with spaced peripheral arcuate recesses or depressions of a contour to fit the circumference of the sleeve 41; the locking arms 63ª, 64ª, 65ª, and 66ª are likewise provided with an arcuate or concave end to fit the circumference of the sleeve 41 as shown in Figure 17. These locking arms 63ª to 66ª and the locking disk 62 normally engage the slidable sleeve 41 and prevent rotation of the gears to which they are bolted and the train of gears connected therewith. The sleeve 41 is, however, always susceptible of being rotated. When, however, the segmental gear 48 is shifted so as to operate a particular gear train, one of the circumferential slots in the sleeve will be brought directly in alinement with the locking member of that gear train, allowing the said gear train to be actuated.

These different trains of gears will now be described:

The gear 54 meshes with a gear 67 secured upon a shaft 68 that registers the cash. This gear train represents the Canadian nickel gear train. This gear 67 is provided with a long hub 69 upon which a second gear 70 similar to the gear 67 is formed. A third and smaller gear 71 is also formed upon this sleeve and meshes with the locking gear 61.

The gear 55 meshes with a gear 72 formed on a sleeve 73 which is provided with a second gear 72ª meshing with the locking gear 63. These gears represent the 650 token gear train. The sleeve 73 is loosely mounted upon a shaft 74 journalled in the plates 51 and 52. The gear 72 meshes with a small gear 75 loosely mounted upon a shaft 76 journalled in the side plates 51 and 52. The gear 75 meshes with a gear 77 secured upon a shaft 78 that is suitably supported for operating the 650 token register "A".

The gear 56 is fastened on the shaft 53 and its rotation will effect a drive through locking gear 61 and gear 71 to the cash register "D". This represents the dime gear train.

The gear 57 meshes with a gear 79 secured upon the shaft 74 and having a gear 80 bolted thereon. The gear 80 is provided with two diametrically opposite teeth as shown in Figure 16, each of which imparts a fractional rotation to the gear 56 secured to the shaft 53 and connected through the gears 61 and 71 to the cash register. This represents the penny gear train. As the gear 79 is fast upon the shaft 74, the latter will be caused to rotate and revolve the gear 81 which is also fast upon the shaft and meshes with the locking gear 66.

Gear 58 is loose upon the shaft 53 and meshes with a gear 82 loosely mounted upon the shaft 74. A gear 82ª having a common hub with the gear 82 meshes with the locking gear 64 and with a gear 83 loosely mounted on the shaft 76, which in turn meshes with a gear 84 fast upon a shaft 85 which operates the 780 token and 25-cent registering mechanism "B". These gears represent the 780 token and 25-cent gear train.

Gear 59 which is loose upon the shaft 53 meshes with the aforementioned gear 70 that operates the cash register "D" and that is connected with the gear 71 that operates the locking gear 61. These gears represent the United States nickel gear train.

Gear 60 is likewise loose upon the shaft 53 and meshes with a gear 86 secured upon a shaft 87 that operates the 900 token register "C". A gear 86ª having a common hub with gear 86 meshes with the aforedescribed locking gear 65. This train of gears represents the 900 token gear train.

From the foregoing, it will be apparent that each train of gears embodies a locking mechanism which makes it impossible to operate the train of gears until the sleeve 41 has been properly shifted for releasing such locking mechanism.

The rotary coin disk and the trains of gears are adapted to be operated by the crank 1 which is secured upon a main driving shaft 88 (Figure 5) which has a spur gear 89 keyed thereon which meshes with the gear 46 on the bushing 42 for operating the master segmental gear 48 and putting the trains of gears into motion. A bevel pinion 90 is also secured upon said shaft 88 and meshes with the bevel gear 10 on the rotary coin carrying disk 3 for imparting rotation thereto.

The operation is as follows:

Assuming that certain coins or tokens have been deposited in the hopper and it is desired to register the same, the operator will grasp the crank 1 and rotate the same, thereby rotating the coin disk and selective sleeve 41. As the coin disk revolves, the coins or tokens will settle in the pockets 3ᵉ and be carried upward in an anti-clockwise direction with reference to Figure 2; the surplus coins in the pockets will be swept aside by the stripper plate 91 so that only a single coin remains in the pocket. When the pocket reaches its uppermost position, the coin will be retained therein and guided by the yieldably supported elements 92 and just before the coin reaches the roller 5, it passes under a vertically yieldable guide plate 93 (Figures 2 and 3) secured to the plate 6. When the coin reaches the roller 5, it will pass thereunder and elevate the arm 33 and thereby actuate the lever 30 which in turn operates the lever 29 for pressing the pawl 21 into engagement with a predetermined tooth of the ratchet arm 16. It will be understood that the ratchet arm 16 has been oscillating during the rotation of the coin disk and the mechanism is so timed that the ratchet arm 16 will be moving or about to move from left to right as viewed in Figure 4 when the lever 29 is actuated to press the pawl into engagement with a ratchet tooth. Figure 4 shows the pawl in engagement with the first ratchet tooth. This means that the largest coin or token has just passed under the roller 5 which has actuated the levers 30 and 29 to press the pawl into engagement with the ratchet arm before it has actually started to travel back. Now assuming that a coin of smaller diameter has passed under the roller 5, the action of the levers 30 and 29 will have been delayed until the ratchet bar 16 has moved some distance to the right so that the pawl 21 will be forced into engagement with some intermediate tooth. As it is only necessary that the teeth on the pawl 21 initially engage somewhere between the teeth on the ratchet arm, they need not be in exact position for registering, since they can be forced into tight engagement through a slight relative shifting of the pawl and ratchet arm. Therefore it does not matter whether the coins or tokens are slightly over or under size or are mutilated to a certain extent, since such variations are within the range of the inclinations of the teeth.

It will therefore be apparent that the size of the coin determines the point of engagement between the pawl and ratchet, and this determines the throw of the lever 20 which in turn governs the amount of rotation of the gear 24 and also of the sleeve shifting segment gear 36; the movement of the segment gear determining the amount of shifting movement imparted to the sleeve 41.

Now assuming that a coin has actuated the pawl 21 into engagement with the ratchet arm 16, at this point, the cam 11 will be in a position for actuating the stud 18 and ratchet arm 16 to the right as viewed in Figures 4 and 5. The lever 20 will be simultaneously swung to the right for actuating the rack bar 23 and rotating gear 24, and segment gear 36 for shifting the sleeve 41 for connecting the gear segment 48 with the proper gear train. When the proper gear train has thuswise been brought into mesh with the segment gear 48, the stud 18 will have reached a dwell 11$^a$ in the cam 11 which dwell is sufficiently long to allow the gear train to be actuated for registering the coin. At the end of such dwell, the segment gear 48 will have passed out of engagement with the gear train, the cam 11 will then actuate the ratchet arm 16 and lever 20 to the left. The rack arm 23 upon such return will rotate the gear 24 and segment 36 for shifting the sleeve 41 back to its initial or normal position, and when the sleeve 41 is back in normal position, the roller 26 will have reached the enlargement 28 in the slot 27 and the spring 22 will disengage the pawl 21 from the lever 20. At about this time another coin may be brought under the roller 5 for repeating the operation.

As soon as the crank is operated, the sleeve 41 will of course be rotated thru the gear 89 and 46, and by the time the sleeve 41 has been properly shifted, as before explained, the master segmental gear 48 will have rotated sufficiently to engage the proper gear train and the locking segment 40 will now also have been rotated to engage a groove in the interlocking member 40$^a$, thus locking the master gear in its adjusted position. Further rotation of the crank 1 will obviously rotate the gear train with which the segmental gear 48 has been engaged. When the segmental gear 48 passes out of mesh with its gear train, the locking segment 40 will also pass out of its groove in the interlocking member. At this point, the cam 11 will be in position to actuate the ratchet arm and lever 20 in the opposite direction, or to the left in Figure 4, whereby the shaft 35 is rotated in a reverse direction to slide the sleeve 41 back into initial position and whereby one cycle of operation is completed. While the sleeve 41 is being longitudinally moved to initial position, the master segmental gear 48 and the locking segment 40 will of course be given a partial rotation to bring the same into the position shown in Figures 5 and 11.

Now assume that the smallest coin which may be a Canadian nickel has passed under the roller 5, the sleeve 41 will be shifted as before explained to bring the segmental gear 48 into mesh with the gear 54 on the shaft 53 and a slot 49 in the sleeve in alinement with the locking disk 62, whereby the gear 61 becomes unlocked, allowing the gear 67 which meshes with the gear 54 to be rotated for registering the coin on the cash register "D". As before explained, the sleeve 41 will be locked by the parts 40 and 40$^a$ from longitudinal shifting movements while it is actuating the gear train. As soon as the segmental gear 48 passes out of engagement with the gear 54, the cam 11 will be in such a position as to return the sleeve 41 before another coin passes under the roller 5.

Now assume that the next smallest coin or token follows, which in the present instance represents the 650 token. It will operate the mechanism as above set forth to shift the sleeve 41 to bring the segmental gear 48 into mesh with gear 55 and the slot 50 into registry with the locking arm 63$^a$ thereby unlocking gears 63 and 72 and allowing gear 55 to rotate gears 72, 75 and 77 for actuating the token registering shaft 78.

It seems unnecessary to describe the operations arising from the dimes, pennies, 780 tokens, nickels and 900 tokens for which this fare box is designed, since they are similar to the operations arising from the Canadian nickel and token above described, except that the segmental gear 48 will be shifted into engagement with different gear trains for operating the same. It might, however, be added that whenever any coin or token passes under the roller 5, the sleeve 41 will be first unlocked, then shifted to bring the segmental gear 48 into mesh with the proper gear train which will become unlocked through one of the arcuate slots in the sleeve 41, while the sleeve 41 will become locked from longitudinal movement by the interlocking member 40ª during such period as the segmental gear 48 is operating the gear train, and when the gear 48 passes out of mesh with the gear train, the cam 11 will be in proper position to shift the sleeve 41 back to its initial position, the sleeve 41 having rotated in the meantime out of locking engagement with the interlocking member 40ª. Thereafter another cycle of operation may follow.

It will accordingly be apparent that the aforedescribed structure is adapted for universal service in that different coins and tokens may be registered, and that the different gear trains are normally locked and only become unlocked when the segmental gear is shifted into mesh therewith. Likewise, the segmental gear becomes locked from longitudinal shifting movements when operating a gear train. It should be noted that the operating parts are compact and simple and operate efficiently.

We are aware that numerous details of construction may be varied through a wide range without departing from the principles of this invention, and we therefore do not purpose limiting the patent granted otherwise than necessitated by the prior art.

We claim as our invention:

1. In a fare box, a plurality of gear trains, a shiftable member adapted to be brought into operative relation with a predetermined gear train, means comprising a locking segment on said shiftable member and a stationary toothed member for locking said shiftable member in its adjusted position, and means cooperating with said shiftable member for locking the other gear trains from operation.

2. In a fare box, a gear train, a shiftable member having a segmental gear thereon, an arcuate locking segment on said member, an interlocking member having a plurality of notches adapted for receiving said locking segment, coin controlled means for shifting said segmental gear into engagement with said gear train, said locking disk engaging said interlocking member while said gears are in engagement.

3. In a fare box, a plurality of gear trains adapted for operating registering mechanism, each train having a locking arm with a concave end, a shiftable member engaging said concave ends for normally locking said gear trains, said member having circumferential slots for receiving said arms to unlock the corresponding gear train, and a segmental gear for engagement with said gear trains, and cam controlled means for shifting said member into engagement with a gear train with one of said circumferential slots in registry with the locking arm of said gear train.

4. In a fare box, a plurality of gear trains for operating registering mechanism, a shiftable gear for selectively engaging said gear trains, cam controlled mechanism for shifting said gear, means for continuously rotating said gear, and means for locking said gear against shifting movements at predetermined times.

5. In a fare box, a plurality of gear trains for operating registering mechanism, a shiftable member embodying a gear for selectively engaging said gear trains, coin controlled means for shifting said member, means for rotating said member, a stationary interlocking device, and a cooperating locking device on said member adapted for intermittently engaging said stationary device.

6. In a fare box, a plurality of gear trains adapted for actuating registering mechanism, a rotary and shiftable member adapted for selectively engaging said gear trains, a rotary segment engaging said member for shifting the same, a shaft for supporting said rotary segment, a gear on said shaft, a rack bar engaging said gear, a lever connected to said rack bar, and having a pawl, a ratchet bar adjacent said lever, a cam for oscillating said ratchet bar, and coin controlled mechanism for engaging said pawl and ratchet.

7. In a fare box, a plurality of gear trains adapted for actuating registering mechanism, a rotary and shiftable member adapted for selectively engaging a gear train, said member having circular spaced teeth, an oscillatable segment in engagement with said teeth, a shaft for supporting said segment, a gear on said shaft, and coin controlled mechanism for operating said shaft.

8. In a fare box, a plurality of gear trains, a rotary and shiftable member adapted for engagement with one of said gear trains, a stationary member and a rotary segmental element movable with said shiftable member, and adapted for interlocking engagement with said stationary member during a partial rotation of said shiftable member.

9. In a fare box, a plurality of gear trains, a shiftable gear for selectively engaging a gear train, coin controlled mechanism for shifting said gear, and a pair of co-operative members adapted to be brought into interlocking engagement during a partial revolution of said shiftable gear and passing out of interlocking relation thru a second partial revolution thereof.

10. In a fare box, a plurality of gear trains, a shiftable segmental gear for engaging a gear train and means for retaining said segmental gear in any adjusted position, comprising a pair of interlocking members, one segmental in shape and rotatable with said shiftable gear and adapted for interlocking engagement with the other member only during the meshing relation of said segmental gear.

In testimony whereof, we have hereunto subscribed our names.

HUGO J. BAUR.
ERNEST H. THOMPSON.